United States Patent
Guillot et al.

(10) Patent No.: US 12,012,242 B2
(45) Date of Patent: Jun. 18, 2024

(54) PROCESS FOR CONDITIONING GLASS OR PORCELAIN ELECTRICAL INSULATORS COATED WITH SILICONE

(71) Applicant: SEDIVER, Courbevoie (FR)

(72) Inventors: Mylène Guillot, Orléat (FR); Thomas Goigoux, Abrest (FR)

(73) Assignee: SEDIVER, Courbevoie (FR)

( * ) Notice: Subject to any disclaimer, the term of this patent is extended or adjusted under 35 U.S.C. 154(b) by 0 days.

(21) Appl. No.: 17/860,165

(22) Filed: Jul. 8, 2022

(65) Prior Publication Data

US 2023/0012421 A1    Jan. 12, 2023

(30) Foreign Application Priority Data

Jul. 8, 2021   (FR) ..................................... 2107405

(51) Int. Cl.
*B65B 31/04*   (2006.01)
*B65B 5/04*    (2006.01)
*B65B 51/10*   (2006.01)

(52) U.S. Cl.
CPC ............ *B65B 31/048* (2013.01); *B65B 5/045* (2013.01); *B65B 51/10* (2013.01)

(58) Field of Classification Search
None
See application file for complete search history.

(56) References Cited

U.S. PATENT DOCUMENTS

| | | | | |
|---|---|---|---|---|
| 2,651,444 A * | 9/1953 | Casey | ................... | B65B 51/146 53/374.8 |
| 2,672,268 A * | 3/1954 | Bower | ................ | B29C 65/7847 229/87.08 |
| 2,888,792 A * | 6/1959 | James | ..................... | B65B 31/06 53/79 |
| 4,860,523 A * | 8/1989 | Teteishi | .................. | B65B 31/06 53/512 |
| 5,664,408 A * | 9/1997 | Chesterfield | ............ | B65B 31/06 53/512 |
| 2015/0203225 A1 * | 7/2015 | Zouta | ..................... | B65B 31/06 53/510 |

(Continued)

FOREIGN PATENT DOCUMENTS

| | | |
|---|---|---|
| EP | 1323642 A1 | 7/2003 |
| EP | 3299304 B1 | 2/2019 |

(Continued)

OTHER PUBLICATIONS

Preliminary Research Report dated Mar. 18, 2022 issued by the INPI in corresponding French Patent Application No. 2107405, 3 pages.

(Continued)

*Primary Examiner* — Tanzim Imam
(74) *Attorney, Agent, or Firm* — Ware, Fressola, Maguire & Barber LLP

(57) ABSTRACT

Method for packaging electrical insulators (4) for high voltage or very high voltage, such as electrical line insulators made with a dielectric material chosen from glass or porcelain, and more specifically, electrical insulators with a protective hydrophobic silicone elastomer coating covering the surface of the electrical insulators, under vacuum or under inert gas.

11 Claims, 2 Drawing Sheets

(56) References Cited

U.S. PATENT DOCUMENTS

2015/0257426 A1\* 9/2015 Keeler ................. A23B 4/0056
                                                    426/127
2018/0251245 A1\* 9/2018 Jung ................... B29C 66/1122
2018/0319523 A1\* 11/2018 Palumbo ................ B65B 51/16

FOREIGN PATENT DOCUMENTS

JP          H09165069 A       6/1997
WO      WO-2018220294 A1 \* 12/2018    ............. H01B 19/04
WO      WO-2021039084 A1 \*  3/2021    ............. A61J 1/1468

OTHER PUBLICATIONS

"RTV Silicone Rubber Pre-coated Ceramic Insulators for Transmission Lines" by E. A. Cherney et al., IEEE Transaction on Dielectrics and electrical Insulation, vol. 20, No. 1, Feb. 2013, pp. 237-244.

\* cited by examiner

PROCESS FOR CONDITIONING GLASS OR PORCELAIN ELECTRICAL INSULATORS COATED WITH SILICONE

CROSS REFERENCE TO RELATED APPLICATION

This application claims priority under 35 USC § 119 to French Patent Application No. 2107405 filed on Jul. 8, 2021, which is hereby incorporated by reference in its entirety.

TECHNICAL FIELD

The field of the invention is that of packaging electrical insulators for high voltage or very high voltage, such as electrical line insulators made with a dielectric material chosen from glass or porcelain and more particularly electrical insulators with a coating of protective hydrophobic silicone elastomer covering the surface of the electrical insulators.

BACKGROUND

It is known to package electrical insulators in unit form or in the form of a chain of electrical insulators in wooden cases for shipping and/or storage. Nevertheless, friction and/or impacts between the insulators and the wood of the boxes during the handling of the boxes may lead to a degradation of the silicone coating.

The article "RTV Silicone Rubber Pre-coated Ceramic Insulators for Transmission Lines" by E. A. Cherney et al., IEEE Transaction on Dielectrics and electrical Insulation, Vol. 20, No. 1; February 2013, pages 237-244, describes the use of pre-coated ceramic insulators, their packaging, and their transport.

The patent document EP 1 323 642 A1 describes a shock absorbing package and its use, obtained by heat-sealing a shock absorbing sheet and a thermoplastic resin film.

The patent document EP 3 299 304 B1 describes a suction apparatus for putting vacuum insulation panels under vacuum or for the production of vacuum packs.

To protect the electrical insulators from friction and/or impacts in the wooden boxes, foam padding has been introduced into the boxes so as to insulate the electrical insulators from the wood of the boxes.

However, wooden crates containing the electrical insulators and fitted with foam padding may be stored for long periods on construction sites prior to the installation of the electrical insulators. As these construction sites may be located in areas subject to critical external conditions such as heavy rains, floods, or in contact with standing water, moisture is absorbed by the foam padding. When the foam is wet, its dampness in prolonged contact with the electrical insulators may cause the silicone coating to detach, causing the electrical insulators to deteriorate before they are installed. Degradation of the silicone coating also occurs when electrical insulators are in direct and prolonged contact with standing water.

Manufacturers of electrical insulators are thus seeking a method for packaging electrical insulators that makes it possible to overcome these drawbacks.

SUMMARY OF THE INVENTION

The object of the invention is to propose a method for packaging electrical insulators made of glass or porcelain with a silicone coating which makes it possible to better protect the electrical insulators from impacts and/or friction during the handling of the boxes containing the electrical insulators while limiting ambient dampness and the formation of condensation that may come into contact with the electrical insulators during storage.

To this end, the subject of the invention is a method for packaging electrical insulators made of glass or porcelain with a silicone coating comprising the following steps:
  inserting an electrical insulator or a chain of electrical insulators inside a watertight and airtight sealing pouch through an open portion of the pouch, the open portion of the pouch being delimited by two edges to seal against each other to create a sealing band and to hermetically close the pouch,
  superimposing the two edges to form the sealing strip and to position the sealing strip between two welding bars of a sealing machine,
  inserting a first end of an air suction nozzle between the two edges of the pouch to be sealed,
  closing the sealing bars so as to hold the first end of the suction nozzle between the two edges to be sealed and pinching the sealing strip,
  applying a vacuum source to a second end of the suction nozzle until a proper vacuum level has been reached,
  once the proper vacuum level has been reached, removing the air suction nozzle held between the two edges of the pouch and applying a seal by welding the sealing strip.

The method according to the invention may have the following specific features:
  the first end of the nozzle may be flattened;
  the multilayer material of the pouch may be polyethylene terephthalate (PET)/aluminum/oriented polyamide (OPA)/polyethylene (PE);
  the multilayer material of the pouch may be recyclable or biodegradable;
  an inert gas may be introduced into the air-free pouch before sealing by welding the sealing strip.

Advantageously, the electrical insulator, or the chain of electrical insulators, vacuum-packed in a watertight and airtight pouch, may be kept in all types of storage areas and will remain hermetically protected from any surrounding dampness before use, thus ensuring good integrity of the silicone coating of the electrical insulator.

This packaging method is all the more advantageous when the pouch, forming a primary packaging, is mechanically resistant to handling and transport, which also makes it possible to protect the electrical insulator from impacts and/or friction with other materials forming the secondary packaging, such as a wooden crate.

The flattened shape of the first end of the suction nozzle improves its proper retention between the edges of the pouch to be sealed and improves the seal of the sealing strip during the suction of the air contained in the pouch because the sealing bars of the sealing machine, which are usually fitted with Teflon or rubber tape, will conform better to the flattened shape of the nozzle end.

In some cases, an inert gas could advantageously be introduced into the air-free pouch so as to improve the storage and preservation conditions of an electrical insulator with a silicone coating.

BRIEF DESCRIPTION OF THE DRAWINGS

The present invention will be better understood and other advantages will appear on reading the following description and from the appended drawings in which.

DETAILED DESCRIPTION

The packaging method according to the invention applies to components made of a dielectric material chosen from glass or porcelain, more particularly electrically insulating electrotechnical components such as electrical insulators for high and very high voltage.

Figure 1:
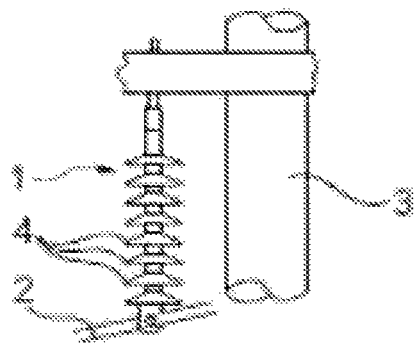
FIG. 1 very schematically shows a chain of electrical insulators for an electrical line.
Figure 2:
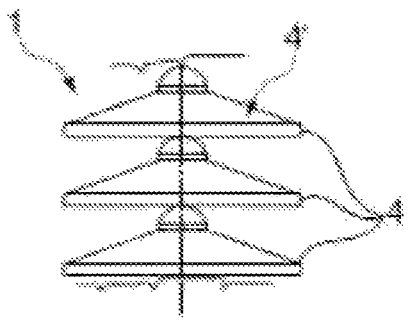
FIG. 2 very schematically shows a succession of several electrical insulators of the chain of electrical insulators to be packaged according to the invention.

FIG. 1 illustrates by way of example a chain 1 of electrical insulators 4 for a high or very high voltage power line 2 suspended on a pylon 3, and FIG. 2 shows a succession of several electrical insulators 4 of the chain 1 illustrated in FIG. 1 which may, for example, be electrical insulators 4 with a skirt made of tempered glass, the outer surface 4' of which is coated with a silicone-based protection. Said silicone coating of the skirt, when it is in prolonged and recurrent contact with dampness during prolonged storage, for example, tends to degrade, with the silicone coating detaching from the skirt.

Figure 3:
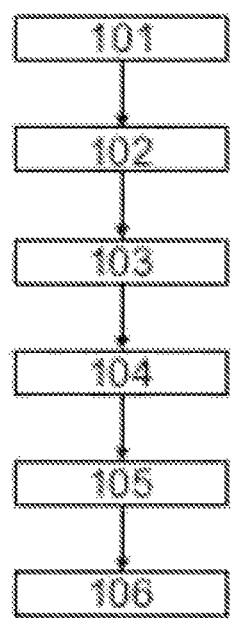
FIG. 3 illustrates the different packaging steps of the method according to the invention.
Figure 5A:
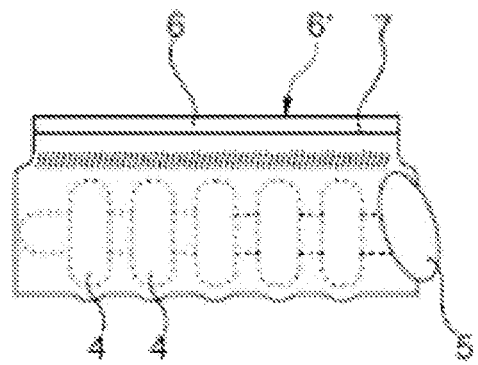
FIG. 5A and FIG. 5B very schematically show a chain of electrical insulators packaged under vacuum or under inert gas in a pouch to be sealed, in a front view in FIG. 5A and in profile in FIG. 5B.
Figure 5B:
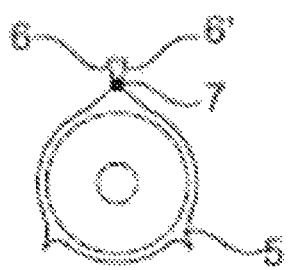

According to the packaging method of the invention illustrated with a diagram in FIG. 3, one or more electrical insulators made of glass or porcelain with a silicone coating are packaged under vacuum or under inert gas in a pouch 5, shown in FIGS. 5A and 5B. This pouch 5 is watertight and airtight, and the pouch 5 also has mechanical strength so as to protect the electrical insulator(s) from impacts and/or friction with other materials during handling and/or transportation of the electrical insulator(s). The pouch 5 is also weldable so that it may be closed hermetically.

The pouch 5 may be made of any material known to be watertight and airtight and mechanically strong, preferably a multilayer material of polyethylene terephthalate (PET)/aluminum/oriented polyamide (OPA)/polyethylene (PE), which has shown satisfactory results for preserving the silicone coating of electrical insulators 4 in damp storage areas. A pouch 5 made of a recyclable or biodegradable multilayer material that is watertight and airtight may preferably be used.

The packaging method of the invention applies to an electrical insulator 4 but also to a chain 1 of electrical insulators 4, which has a length generally between 1 meter and 1.5 meters, or possibly more.

According to the invention, the method comprises a first step 101 in which an electrical insulator 4 (or a chain 1 of electrical insulators 4) is inserted inside the pouch 5 through an open portion (not shown) of the pouch 5, the open portion being delimited by two edges 6, 6' to be sealed one against the other in order to create a sealing strip 7, which, after sealing, will hermetically close the pouch 5.

Figure 4:
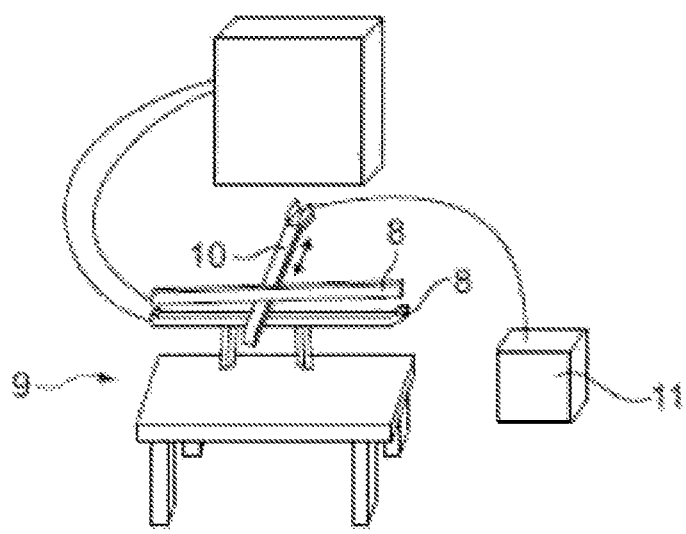
FIG. 4 very schematically illustrates a sealing machine for packaging one or more electrical insulators in a sealing pouch.

Once the electrical insulator 4 has been inserted into the pouch 5, a second step 102 consists in superimposing the two edges 6, 6' of the open portion of the pouch 5 to form the sealing strip 7, which protrudes from the pouch 5 in order to position it between two sealing bars 8 of a sealing machine 9 illustrated in FIG. 4.

Before sealing the pouch 5, it is necessary to remove the air in the pouch 5 by using an air suction nozzle 10 connected to a vacuum source 11 such as, for example, a vacuum pump. For this purpose, in step 103, a first end of the suction nozzle 10 is introduced between the two edges 6, 6' of the pouch 5 to be sealed, the second end of the suction nozzle 10 being connected to the vacuum source 11.

Then, in step 104, the two sealing bars 8 approach each other so that, when they are closed against each other, they hold the first end of the suction nozzle 10 between the two edges 6, 6' and pinch the two edges 6, 6' by applying pressure on the sealing strip 7.

The pouch 5 being thus closed by pressure, the vacuum source 11 is activated in step 105 until a proper controllable vacuum level is reached.

When the proper desired vacuum level is reached, in step 106, the suction nozzle 10 is extracted by withdrawing it from the sealing strip 7, a seal is made by welding said sealing strip before releasing the vacuum-sealed pouch 5 shown in FIG. 5A and FIG. 5B by opening the sealing bars 8.

In a particular embodiment, the suction nozzle 10 may have at least the first end flattened so that the flattened shape is easier to join with a flexible seal arranged on each welding bar 8, thus allowing better sealing during the suction of the air from the pouch 5.

In another embodiment, when the proper vacuum level is reached, an inert gas could be introduced into the air-free pouch 5 by any known means, for example through the sealing strip 7, parallel to the air suction nozzle 10, before sealing the sealing strip 7 by welding.

It goes without saying that the present invention is not restricted to the embodiment described above, and may be modified without departing from the scope of the invention.

What is claimed is:

1. A method for packaging an electrical line insulator for a high voltage electric line suspended on a pylon, the electrical line insulator being made of glass or porcelain with a silicone coating, the method comprising the following steps:

inserting an electrical line insulator or a chain of electrical line insulators inside a pouch to be sealed through an open portion of said pouch, said pouch being made of a multilayer material impermeable to water and air, said multilayer material comprising an aluminum layer, said open portion of said pouch being delimited by two edges to be sealed against each other to create a sealing strip intended to hermetically close said pouch, superimposing said two edges to form said sealing strip and positioning said sealing strip between two sealing bars of a sealing machine, inserting a first end of an air suction nozzle between said two edges of said pouch to be sealed, closing said sealing bars so as to hold said first end of said suction nozzle between said two edges to be sealed and pinch said sealing strip, applying a vacuum source to a second end of said suction nozzle until a proper vacuum level is reached, and when said proper vacuum level is reached, removing said first end of said air suction nozzle held between said two edges of said pouch and applying a seal by welding said sealing strip.

2. The method according to claim 1, wherein said first end of said suction nozzle is flattened.

3. The method according to claim 2, wherein said multilayer material of said pouch is made of layers of polyethylene terephthalate (PET)/aluminum/oriented polyamide (OPA)/polyethylene (PE).

4. The method according to claim 2, wherein said multilayer material of said pouch is recyclable or biodegradable.

5. The method according to claim 4, wherein an inert gas is introduced into said pouch after said proper vacuum level is reached and before said welding of said sealing strip.

6. The method according to claim 1, wherein said multilayer material of said pouch is made of layers of polyethylene terephthalate (PET)/aluminum/oriented polyamide (OPA)/polyethylene (PE).

7. The method according to claim 1, wherein said multilayer material of said pouch is recyclable or biodegradable.

8. The method according to claim 3, wherein an inert gas is introduced into said pouch after said proper vacuum level is reached and before said welding of said sealing strip.

9. The method according to claim 2, wherein an inert gas is introduced into said pouch after said proper vacuum level is reached and before said welding of said sealing strip.

10. The method according to claim 1, wherein an inert gas is introduced into said pouch after said proper vacuum level is reached and before said welding of said sealing strip.

11. The method according to claim 1, wherein the electrical line insulator has a skirt made of tempered glass.

\* \* \* \* \*